United States Patent Office 3,390,196
Patented June 25, 1968

3,390,196
POLYMERIZATION PROCESS EMPLOYING A
CHROMIUM COORDINATION CATALYST
Sterling Frank Chappell III, and Jerome Robert Olechowski, Lake Charles, La., assignors to Columbian Carbon Company, New York, N.Y., a corporation of Delaware
No Drawing. Filed Feb. 7, 1966, Ser. No. 525,318
16 Claims. (Cl. 260—666)

ABSTRACT OF THE DISCLOSURE

Processes are described for the polymerization or oligomerization of ethylenically unsaturated monomers at moderate temperatures and pressures in the presence of a coordination catalyst derived from a Ziegler type reducing agent and the hydrocarbon insoluble portion of the interaction product of a positive valence chromium compound with a hydrocarbyl or hydroaluminum halide. The use of such catalysts to convert alpha-monoolefins to high molecular weight solid polymers and to convert open chain conjugated diolefins to large ring cyclic trimers is illustrated.

This invention relates to an improved process for polymerizing ethylenically unsaturated monomers in the presence of a chromium coordination catalyst. More specifically, it relates to the use of a particular novel chromium coordination catalyst, as described herein below, in low concentrations, to rapidly effect the homopolymerization or interpolymerization of such monomers and to produce a product predominating in polymers of uniform structure. A particular embodiment of this invention is the use of such novel coordination catalysts to economically product high yields of cyclic oligomers of conjugated aliphatic dienes.

The use of chromium coordination catalysts to polymerize ethylenically unsaturated monomers is well known. Effective catalysts of this type have been prepared by reacting a chromium compound, such as chromyl chloride or chromium acetylacetonate, with any of a wide variety of cocatalysts, including metals of Groups I-A, II-A, II-B, III-A and organometallic or hydride compounds of said metals and boron. The usual procedure for carrying out such prior art polymerization process is simply to mix the two catalyst components in a hydrocarbon solvent and then pass the ethylenically unsaturated monomer or monomers into the catalyst mixture at atmospheric or slightly elevated pressure and at room temperature or moderately elevated temperatures. Although such procedures have been used commercially for a number of years, they suffer from the distinct disadvantage that their effective utilization requires the maintenance of a high ratio of the relatively expensive cocatalyst to chromium compound. In addition, the polymer product obtained from the use of these prior art catalysts is generally characterized by a wide range of molecular weights, which may effectively reduce the yield of desired product and may necessitate extensive and often difficult product purification procedures. In the case of lower alpha olefin polymerizations, a significant portion of the monomer may be converted to low molecular weight oily polymers which are not suitable for extrusion and for which there is a limited market demand. Similarly, in the production of cyclododecatriene from butadiene using these prior art chromium coordination catalysts, a large proportion of the monomer is converted to undesirable high molecular weight rubbery polymers and cyclic dimers.

It has now been found that the production of these relatively low value products can be drastically curtailed by the use of a highly selective coordination catalyst composition comprising:

(A) A cocatalyst selected from the group consisting of metals of Groups I-A, IIA, II-B, II-A and IV-A and hydride and hydrocarbyl compounds of said metals and boron, and (B) A hydrocarbon insoluble interaction product, which has been separated from the hydrocarbon soluble product of a synthesis system comprising a chromium compound component and an activating component having the empirical formula $R_aAlX_{3-a}$, wherein R is selected from the group consisting of hydrogen and organic radicals, X is a halogen radical, $a$ is from about 0.1 to 3 (preferably from about 0.1 to about 2.9) and the atomic ratio of halogen to chromium in said components is from about 2:1 to about 5:1.

By utilizing such catalyst compositions, and particularly those containing no appreciable quantity of free or combined metal other than chromium and aluminum in the production of 1,5,9-cyclododecatriene from 1,3-butadiene, it has been found to be possible to effect reductions of up to about 50% and more in the consumption of cocatalyst, while obtaining rapid and exceptionally high conversions of the monomer without the concurrent production of large quantities of rubbery polymer or cyclic dimer. Similar savings can be realized in the polymerization of alpha olefins with exceptionally low yields of low molecular weight oily polymers.

The hydrocarbon insoluble interaction product B which is useful in the process of this invention can readily be prepared by simply admixing the aforementioned chromium and aluminum components, permitting them to interact and extracting the soluble portion of the product with a suitable solvent as discussed herein below. Although many of the advantages of the instant invention can be realized by separating the soluble and insoluble interaction products in such fashion, it is often more desirable to effect the interaction of these components in the presence of a sufficient quantity of solvent to completely dissolve both unreacted components. Such procedure is particularly advantageous in that it is possible to visually determine when the components have interacted and the precipitated interaction product is essentially free of unreacted components. Such precipitate can, of course, be separated from the solvent by any conventional means such as filtration or centrifugal separation. Since the hydrocarbon insoluble interaction product is readily destroyed by oxidation or hydrolysis, it should be protected in the same manner as the similarly reactive aluminum alkyls or metallic sodium. This can be accomplished in a number of ways such as by maintaining it under a protective blanket of dry inert gas.

Any organic solvent which is substantially inert, i.e. non-destructive of the aforementioned chromium and aluminum components and their reaction products, may be used in the preparation of the insoluble interaction products of this invention. Materials suitable for use as an interaction medium or extraction solvent include liquid aliphatic hydrocarbons, such as hexane, hexene, butadiene, octane and iso-octane, cycloaliphatic hydrocarbons such as cyclohexane, cyclooctadiene and cyclododecatriene, aromatic hydrocarbons such as benzene, toluene and xylene, ring halogenated aromatic compounds such as chlorobenzene and chlorotoluene, heterocyclic ethers such as tetrahydrofuran and dioxane or any mixture thereof. Since certain aluminum compounds which are suitable for use as activators may form complexes with linear olefins or cyclic ethers that may significantly depress the rate of reaction of these activators with the chromium component, it is usually preferable to employ a saturated aliphatic hydrocarbon or preferably an aromatic hydrocarbon as an interaction medium and to restrict the use of such complexing solvents to the washing of the insoluble interaction product.

The interaction of the chromium and aluminum activator components may be conducted under atmospheric, reduced or elevated pressure. In general, the use of pressures in excess of atmospheric is advantageous only when necessary to maintain the solvent in the liquid phase. Hydrocarbon insoluble interaction products of this invention may be prepared over a wide temperature range such as from about −30° C. to about 150° C. Since these products deteriorate rapidly at greatly elevated temperatures, it is generally preferred to prepare them at about room temperature and, if prolonged storage is contemplated, to maintain them at reduced temperatures down to about −50° C. At such reduced temperatures, little significant deterioration of these materials is noted after storage periods of as long as about a month.

Any chromium compound may be used as the chromium component in the preparation of these insoluble interaction products. Exemplary of such suitable compounds are complexes in which the chromium has a formal valence of zero, such as chromium hexacarbonyl, triphenyl phosphine chromium pentacarbonyl, bis (benzene) chromium and bis (cumene) chromium; inorganic chromium salts such as chromous bromide, chromic bromide, chromic nitrate, chromic sulfate, chromic chloride, chromyl chloride and potassium chromate; organic chromium salts and esters such as chromic acetate, chromous oxalate, chromic benzoate, chromic ethylhexanoate, chromic naphthenate, triphenylchromium, chromic acetylacetonate and chromic benzoylacetonate. In general, it is preferred to use a chromium compound which does not, under the conditions of preparing the insoluble interaction product, liberate water and which is readily soluble in hydrocarbon solvents. Examples of such preferred chromium compound components include the bis (arene) chromium complexes, chromyl halides, chromic salts of organic acids and the particularly preferred chromic chelates of betadiketones.

Compounds suitable for use as the activating component in the preparation of the insoluble interaction product of this invention include dihydrocarbyl aluminum halides, such as diethyl aluminum chloride, diethyl aluminum bromide, diisobutyl aluminum chloride, dioctyl aluminum chloride, diphenyl aluminum chloride and methyl isobutyl aluminum chloride; hydro aluminum halides, such as chloroaluminum dihydride and dichloroaluminum hydride; aluminum dihalides, such as ethyl aluminum dichloride, isobutyl aluminum dichloride, phenyl aluminum dichloride and methylaluminum dibromide; and mixtures thereof. In addition, suitable activating components having the empirical formula $R_aAlX_{3-a}$, wherein R, X and $a$ having the means set forth above, may be mixtures of any of the aforementioned aluminum halides with trihydrocarbyl aluminum compounds, such as trimethyl aluminum, triethyl aluminum, triisobutyl aluminum, trioctyl aluminum and triphenyl aluminum. Furthermore, suitable activators may be produced by admixing any of the aforementioned organoaluminum compounds with inorganic aluminum hydrides and halides, such as aluminum trichloride, aluminum tribromide, aluminum triiodide, aluminum trifluoride and aluminum trihydride. It is not necessary that any of the aforementioned compounds be added to the chromium component as a discrete aluminum hydride, halide or hydrocarbyl compound. A satisfactory un-isolated activator may be produced either ex or in situ by a wide variety of well-known methods; such as by the interaction of aluminum trichloride, powdered aluminum and either an ethylenically unsaturated aliphatic hydrocarbon or a lower aliphatic halide, or by the interaction of an aluminum alkyl and a lower aliphatic halide. When a chromium di or tri halide is used as the chromium component, it is possible to utilize a halogen free aluminum hydride or hydrocarbyl activator to obtain a suitable insoluble interaction product. It is, however, preferable to employ a halogen containing activator, desirably a lower alkyl aluminum halide, with these chromium halides, as well as with all other chromium compounds.

In general, it has been found suitable to use from about one to about six moles of activating component having the aforementioned empirical formula for each mole of chromium component. Larger mole ratios may often be used; however, no advantage is obtained thereby and such excesses may reduce the recovery of insoluble interaction product. Although for reasons of economy, it is generally preferred to use as little activator as possible, the selection of an appropriate mole ratio of activator to chromium component is primarily dependent upon the necessity of maintaining an atomic ratio of halogen to chromium in the mixed components of from about 2:1 to about 5:1 and preferably from about 2.5:1 to about 3.5:1. Both the criticality of these broad limits and the outstanding advantages obtained by operating within the preferred range are clearly demonstrated in the examples set forth below.

Following the isolation of the insoluble interaction product, this chromium-containing material may be admixed with a suitable cocatalyst and used to polymerize ethylenically unsaturated monomers in a conventional manner. As in the preparation of conventional coordination catalysts, suitable cocatalysts include metals of Groups I-A, II-A, II-B, III-A and IV-A of the periodic table and hydride and hydrocarbyl compounds of said metals and boron. Exemplary of such cocatalysts are metallic lithium, sodium, potassium, magnesium, calcium, zinc, aluminum and germanium, and sodium hydride, sodium borohydride, calcium hydride, aluminum hydride, tin hydride, diborane, butyl lithium, phenyl magnesium bromide, diethyl zinc, triphenyl aluminum and diethyl aluminum chloride. Compounds of aluminum, and particularly the aluminum trialkyls, alkyl aluminum hydrides, and aluminum hydrides represent a preferred group of such cocatalysts. The superiority of these aluminum compound cocatalysts in the production of cyclooligomers of conjugated diolefins is clearly demonstrated in the examples set forth below. Examples of such preferred compounds include trimethyl aluminum, triethyl aluminum, triisobutyl aluminum, trioctyl aluminum, diethyl aluminum hydride, ethyl aluminum dihydride and aluminum hydride. These cocatalysts may advantageously be used in quantities of from about one to about fifteen moles or more per mole of chromium in the insoluble interaction product. An outstanding advantage of the instant invention is, however, the fact that high ratios of cocatalyst to chromium are unnecessary. It has been found that highly selective catalysts of outstanding activity can be obtained by the use of less than about 5 moles, and preferably from about 2 to about 4 moles of cocatalyst per mole of chromium in the insoluble interaction product.

Polymerizations utilizing the catalyst of this invention may be conducted over a wide temperature range from well below 0° C. to 220° C. and higher. It is, however, generally unnecessary to operate at such extremes as rapid reaction is experienced under more moderate temperature conditions as for example, from about room temperature to about 130° C.

Any ethylenically unsaturated aliphatic monomer or mixtures therefor may be polymerized by the process of this invention. Exemplary of such compounds are the linear alpha olefins, such as ethylene, propylene, butene-1 and octene-1; substituted derivatives of linear alpha olefins, such as styrene, vinyl cyclohexane, vinyl chloride, and acrylonitrile; and conjugated diolefins, such as 1,3-butadiene, isoprene, 1,3-pentadiene and chloroprene.

The polymerization of the ethylenically unsaturated monomers or the interpolymerization of such monomers may be carried out in a wide variety of ways. The process may be carried out as either a batch or continuous operation and either with or without the use of an inert organic diluent. The polymerizations are preferably carried out under an elevated pressure up to about 1,000 p.s.i.g. or higher; however, atmospheric or sub-atmospheric pressures may also be used. When the monomer is in the vapor phase under the selected temperature and pressure conditions, it is of course preferable to employ a liquid diluent; such as hexane, octane, cyclohexane, cyclooctane, benzene, toluene, xylene or chlorobenzene.

The quantity of catalyst used in the process of the instant invention may be varied over a wide range. In general, the amount of insoluble chromium interaction product can be from less than about 0.1 millimoles to as much as one mole or more per mole of ethylenically unsaturated monomer.

The following examples are illustrative of the preparation of the catalysts of this invention and their use in polymerization processes.

Example 1

Eighteen grams of aluminum chloride, 45 grams of powdered aluminum, 53 grams of chromic chloride and 50 milliliters of benzene are introduced into a dry, nitrogen filled ball mill containing ten stainless steel balls having a diameter of one inch. The mill is then pressured to 200 p.s.i.g. with isobutylene and the contents ground at a temperature of about 50° C. for four hours. The reaction products are then filtered in a nitrogen atmosphere and the insoluble residue washed with an additional 100 milliliters of benzene.

Example 2

A clean dry ball mill is charged with 24 half inch diameter stainless steel balls, 15 grams of aluminum chloride, 36 grams of powdered aluminum, 76 grams of chromium (III) oxide, 50 milliliters of benzene and 100 grams of ethyl chloride. The mixture is ground for eight hours at room temperature and the insoluble residue worked up as in Example 1.

Examples 3 through 13

The following general procedure is used for the preparation of the insoluble chromium reaction products of Examples 3 through 13. A sealed flask is flushed with nitrogen and charged with 100 cc. of dry solvent, chromium compound component and activator component. The interaction mixture is maintained at room temperature for 1 hour, with gentle stirring. The contents of the flask is then filtered under a nitrogen atmosphere, and the residue washed with an additional 100 milliliters of dry solvent. Any additional treatment to which this insoluble chromium residue is subjected is indicated in Table I below.

TABLE I

| Ex. | Chromium component (5 mmol.) | Activator component | Mol. ratio Al:Cr | Atomic ratio halogen:Cr | Solvent | Additional treatment of insol. chromium residue |
|---|---|---|---|---|---|---|
| 3 | Chromous acetate | 15 mmol diethyl aluminum chloride | 3 | 3 | Benzene | |
| 4 | Chromic benzoate | 15 mmol diisobutyl aluminum fluoride | 3 | 3 | Toluene | |
| 5 | Chromic acetylacetonate | 7.5 mmol ethyl aluminum dichloride | 1.5 | 3 | Benzene | |
| 6 | Chromyl chloride | 7.5 mmol diethyl aluminum hydride and 7.5 mmol diethyl aluminum chloride | 3 | 3.5 | n-Hexane | Ppt. washed with 50 ml. chlorobenzene. |
| 7 | Chromous chloride | 17.5 mmol diethyl aluminum hydride and 2.5 mmol ethyl aluminum dichloride | 4 | 3 | Benzene | |
| 8 | Chromic hydroxyacetate | 8.5 mmol triethyl aluminum and 4 mmol aluminum trichloride | 2.5 | 2.4 | Chlorobenzene | Ppt. washed with 50 ml. tetrahydrofuran. |
| 9 | Chromic benzoylacetonate | 20 mmol diethyl aluminum hydride and 20 mmol allyl bromide | 4 | 4 | Benzene | |
| 10 | Bis (cumene) chromium (o) | 7.5 mmol ethyl aluminum dichloride | 1.5 | 3 | do | |
| 11 | Chromic acetylacetonate | 8 mmol diethyl aluminum chloride | 1.6 | 1.6 | do | |
| 12 | do | 15 mmol diethyl aluminum chloride | 3 | 3 | do | |
| 13 | do | 30 mmol diethyl aluminum chloride | 6 | 6 | do | |

Example 14

A 300 milliliter magnetically stirred autoclave is flushed with argon and charged with 115 cc. of a benzene slurry of the chromium precipitate obtained in Example 5, containing 2.5 millimoles of chromium. Ten millimoles of triethyl aluminum in 5 cc. of benzene is then added, the autoclave heated to 60° C. and ethylene pressured in at 400 p.s.i.g. The ethylene pressure is maintained between 300 and 400 p.s.i.g. for one hour and a half, at which time the reactor is cooled, vented and the catalyst deactivated with 30 cc. of 10% by weight solution of hydrogen chloride in methanol. The solid polymer product is then separated by filtration, shredded and washed successively with heptane, additional methanolic hydrogen chloride and methanol. The residue is then dried under vacuum for four hours at 80° C. to yield 35 grams of solid polyethylene containing less than one methyl group per thousand carbon atoms.

Examples 15 through 30

In each of Examples 15 through 30, an evacuated 500 milliliter magnetically stirred autoclave is charged with catalyst components as shown below in Table II, 50 milliliters of dry benzene and 104 grams of 1,3-butadiene. The autoclave is then heated to 80° C. with stirring for a period of 45 minutes. At this time, the autoclave is cooled, vented, and the catalyst deactivated by the addition of 50 milliliters of 18% aqueous hydrochloric acid. The advantages of the process of this invention, as demonstrated by Examples 16, 20 and 22 through 30, will be obvious from a comparison with the prior art processes, as exemplified by Examples 18, 19 and 21. The criticality of the halogen to chromium ratio in the preparation of the insoluble interaction products of Examples 11, 12 and 13 is clearly evident from Examples 15, 16 and 17 which utilize these interaction products.

TABLE II

| Ex. | Chromium Source | Mmol Cr | Reducing Agent | BD Conversion, percent | Selectivity, percent Vinylcyclohexene percent Cyclooctadiene | Cyclododecatriene | Nonvolatile Polymer |
|---|---|---|---|---|---|---|---|
| 15 | Residue from Example 11 | 5 | 15 mmol triethyl aluminum | 92 | Trace | 1 | 99 |
| 16 | Residue from Example 12 | 5 | ___do___ | 100 | 0.3 | 86.9 | 12.8 |
| 17 | Residue from Example 13 | 5 | ___do___ | 100 | Trace | 5 | 95 |
| 18 | Chromic acetylacetonate | 5 | ___do___ | 93 | 30 | 1 | 68 |
| 19 | ___do___ | 5 | 15 mmol triethyl aluminum and 15 mmol diethyl aluminum chloride. | 90 | 13 | 48 | 39 |
| 20 | Residue from Example 7 | 5 | 15 mmol diethyl aluminum hydride | 96 | 0.4 | 83.3 | 16.3 |
| 21 | Chromous chloride | 5 | ___do___ | 74 | Trace | 22 | 78 |
| 22 | Residue from Example 1 | 2.5 | 10 mmol triethyl aluminum | 98 | | 84 | |
| 23 | Residue from Example 2 | 2.5 | 7.5 mmol lithium borohydride | 100 | | 24 | 74 |
| 24 | Residue from Example 3 | 2.5 | 10 mmol butyl lithium | 99 | | 71 | |
| 25 | Residue from Example 4 | 2.5 | 10 mmol triphenyl aluminum | 90 | | 83 | |
| 26 | Residue from Example 5 | 2.5 | 7.5 mmol triisobutyl aluminum | 100 | | 91.4 | |
| 27 | Residue from Example 6 | 2.5 | 7.5 mmol diethyl aluminum hydride | 92 | | 85 | |
| 28 | Residue from Example 8 | 2.5 | 8 mmol triethyl aluminum | 100 | | 90.5 | |
| 29 | Residue from Example 9 | 2.5 | 10 mmol diethyl zinc | 78 | | 33 | 58 |
| 30 | Residue from Example 10 | 2.5 | 7.5 mmol triethyl aluminum | 97 | | 88 | |

We claim:
1. Process comprising contacting a conjugated diolefin hydrocarbon selected from the group consisting of butadiene, isoprene and pentadiene with a catalyst composition consisting essentially of:
   (A) a hydrocarbon insoluble interaction product, separated from the hydrocarbon soluble product of an admixture of a chromium (II), (III) or (VI) compound component and from about 1 to about 6 moles per mole of such chromium component of an activating component having the empirical formula $R_aAlX_{3-a}$, wherein R is selected from the group consisting of hydrogen and hydrocarbyl radicals, X is a halogen radical, $a$ is from about 0.1 to about 2.9, and the atomic ratio of halogen to chromium in said components is from about 2:1 to about 5:1, and
   (B) a cocatalyst selected from the group consisting of hydride and hydrocarbyl compounds of metals of Groups I–A, II–A, II–B, III–A and IV–A and boron.
2. The process of claim 1 wherein said cocatalyst is an aluminum alkyl.
3. The process of claim 1 wherein said cocatalyst is an aluminum hydride.
4. The process of claim 1 wherein said activating component is an alkyl aluminum halide.
5. The process of claim 1 wherein said activating component is an alkyl aluminum monochloride.
6. The process of claim 1 wherein said activating component is an alkyl aluminum dichloride.
7. The process of claim 1 wherein said activating component is an interaction product of at least two aluminum compounds selected from the group consisting of aluminum trihalides, alkyl aluminum dihalides, dialkyl aluminum halides and aluminum trialkyls.
8. The process of claim 1 wherein said activating component is an interaction product of an aluminum trihalide, aluminum metal and an ethylenically unsaturated lower aliphatic hydrocarbon.
9. The process of claim 1 wherein said activating component is an interaction product of aluminum trichloride, aluminum metal and a lower alkyl chloride.
10. The process of claim 1 wherein said activating component is an interaction product of an aluminum alkyl and an aliphatic halide.
11. The process of claim 1 wherein the atomic ratio of halogen to chromium in said components is from about 2.5:1 to about 3.5:1.
12. The process of claim 1 wherein said cocatalyst is present in the amount of from about one to about fifteen moles per mole of chromium in said insoluble interaction product.
13. Process comprising:
   (A) interacting a hydrocarbon soluble chromium (II), (III) or (VI) compound component with from about 1 to about 5 moles per mole of said chromium component of a second component having the empirical formula $R_aAlX_{3-a}$, wherein R is selected from the group consisting of hydrogen and hydrocarbyl radicals, X is a halogen radical, $a$ is from about 0.1 to about 2.9 and the atomic ratio of halogen to chromium in said components is from about 2:1 to about 5:1,
   (B) contacting said components with an essentially inert organic solvent for said components and separating an insoluble interaction product therefrom,
   (C) admixing said insoluble interaction product with an aluminum alkyl cocatalyst, said cocatalyst being present in the amount of from about one to about fifteen moles per mole of chromium in said insoluble interaction product,
   (D) contacting liquid 1,3-butadiene with a catalyst composition consisting essentially of the admixture of said insoluble interaction product and said cocatalyst and
   (E) recovering a cyclooligomer of said butadiene.
14. The process of claim 13 wherein said chromium component is an inorganic chromium salt.
15. The process of claim 13 wherein said chromium component is an organic chromium (III) compound.
16. Process for the production of 1,5,9-cyclododecatriene comprising contacting liquid 1,3-butadiene with a catalyst consisting of a composition produced by admixing an aluminum trialkyl and a separated chromium containing precipitate from the interaction, in a hydrocarbon solvent solution, of a chromic beta-diketonate component and an alkyl aluminum chloride component, wherein the atomic ratio of chlorine to chromium in said components is from about 2.5:1 to about 3.5:1 and the atomic ratio of aluminum in said aluminum trialkyl to chromium in said precipitate is from about 2:1 to about 4:1.

References Cited

UNITED STATES PATENTS

| | | | |
|---|---|---|---|
| 2,979,543 | 4/1961 | Wilke | 260—666 |
| 3,008,943 | 11/1961 | Guyer | 260—93.7 |
| 3,083,246 | 3/1963 | Holzman | 260—683.15 |
| 3,167,593 | 1/1965 | Mueller | 260—666 |
| 3,231,627 | 1/1966 | Royston | 260—666 |
| 3,326,990 | 6/1967 | Clark | 260—666 |

FOREIGN PATENTS 921,954    3/1963    Great Britain.

DELBERT E. GANTZ, *Primary Examiner.*

PAUL M. COUGHLAN, *Examiner.*

V. O'KEEFE, *Assistant Examiner.*